United States Patent
Drews et al.

(10) Patent No.: US 6,824,300 B2
(45) Date of Patent: Nov. 30, 2004

(54) HEADLAMP MOUNTING PLUG

(75) Inventors: Edwin R. Drews, Anderson, IN (US); Michael W. Beeler, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/174,756

(22) Filed: Jun. 19, 2002

(65) Prior Publication Data

US 2003/0235057 A1 Dec. 25, 2003

(51) Int. Cl.⁷ ............................ F21S 8/10; F21V 14/02; F21V 7/00
(52) U.S. Cl. ...................... 362/515; 362/528; 362/226; 362/421
(58) Field of Search ................................. 362/515, 528, 362/226, 421, 549; 403/122, 135, 142, 143; 248/481, 181.1, 181.2, 288.31

(56) References Cited

U.S. PATENT DOCUMENTS

| | | |
|---|---|---|
| 3,506,290 A | 4/1970 | Gottschald |
| 4,679,958 A | 7/1987 | Mizusawa et al. |
| 4,707,771 A | 11/1987 | Van Duyn et al. |
| 4,904,107 A | 2/1990 | Fukukawa et al. |
| 4,974,123 A | 11/1990 | Luallin et al. |
| 5,045,987 A | 9/1991 | Hebert |
| 5,153,976 A | 10/1992 | Benchaar et al. |
| 5,313,374 A | 5/1994 | Pinson |
| 5,360,282 A | 11/1994 | Nagengast et al. |
| 5,427,467 A | 6/1995 | Sugiura |
| 5,483,425 A | 1/1996 | Luallin et al. |
| 5,541,815 A | 7/1996 | Nakamura |
| 5,577,836 A | 11/1996 | Vent et al. |
| 5,611,635 A | 3/1997 | Schütt et al. |
| 5,647,713 A | 7/1997 | Ge et al. |
| 5,833,383 A * | 11/1998 | Bauman ..................... 403/122 |
| 5,897,202 A | 4/1999 | Denley |
| 5,908,239 A * | 6/1999 | Sugimoto ................... 362/528 |
| 6,086,233 A | 7/2000 | Maeda et al. |
| 6,089,737 A | 7/2000 | Ito |
| 6,244,735 B1 * | 6/2001 | Burton ....................... 362/528 |
| 2002/0114660 A1 * | 8/2002 | Burton ....................... 403/122 |

* cited by examiner

Primary Examiner—Stephen Husar
Assistant Examiner—Sharon Payne
(74) Attorney, Agent, or Firm—Jay G. Taylor; Alexander D. Forman; Ice Miller

(57) ABSTRACT

A mounting plug for pivotably connecting a first component to a second component. The mounting plug comprises a ball stud portion comprising a ball and a post. The post comprises means for attaching the ball stud portion to the first component. The mounting plug further comprises a base and a socket chamber integrally molded on top of the base. The socket chamber is adapted to removably and pivotably retain the ball stud portion. The mounting plug further comprises a channel integrally molded to the base adjacent to the socket chamber, with the channel adapted to allow the ball to be inserted there through and into the socket chamber. The mounting plug further comprises a retainer portion integrally molded below the base. The retainer portion comprises at least one tab integrally molded to the retainer portion and adapted to removably secure the socket portion to the second component.

32 Claims, 10 Drawing Sheets

HEADLAMP MOUNTING PLUG

BACKGROUND OF THE INVENTION

This invention relates generally to ball and socket mounting arrangements. More specifically, the present invention relates to a ball and socket assembly for pivotally mounting a vehicular headlamp.

Motor vehicles are legally required to have external illumination provided by headlamps for illuminating oncoming road or terrain and to make their vehicle visible to the drivers of other vehicles. Headlamps illuminate approaching roadway or terrain by projecting a light in front of a vehicle. Indeed, headlamps are a significant safety feature of modern vehicles, and their use is both common and well known in the art.

Headlamps are often designed as sealed assemblies. The assemblies are designed such that they can be incorporated into a vehicle's front end. To this end, headlamp assemblies must be shaped and constructed to conform to the space limitations, the aerodynamic requirements, and the aesthetic requirements of each vehicle model. To maintain proper angular orientation of the lamps with respect to the vehicle, headlamps are provided with aiming mechanisms. These mechanisms often serve to both aim and support the lamp.

Aimable headlamps may be divided into two broad categories. This classification is made based on the member that must be tilted to aim the beam, i.e. the aimable component. In the first of these categories the complete headlamp unit, comprising an electric lighting bulb or bulbs, a reflector or reflectors, and a lens, is tilted relative to the vehicle or to a lamp housing fixed to the vehicle. In the second of these categories only the bulb(s) and reflector are tilted relative to the rest of the lamp assembly which is fixed to the vehicle.

In either case, a typical aiming mechanism comprises three supports: one horizontal adjusting mechanism, one vertical adjusting mechanism, and one pivotal connection. The relative placement of the pivotal connection, the horizontal adjusting mechanism, and the vertical adjusting mechanisms are such that the horizontal adjuster adjusts horizontally and the vertical adjuster adjusts vertically, from the pivotal connection. This allows the two adjustment mechanisms to serve the function of providing means for adjusting the position of the lamp unit along both vertical and horizontal axes in relation to a support frame attached to the vehicle. In this manner, the direction of a light beam emanating from the lamp unit can be adjusted in a horizontal plane and in a vertical plane to achieve a desired direction of aim. Both the aiming adjustment mechanisms and the pivot connection are load-bearing in that they bear the weight of the lamp unit while supporting it within the support frame.

Generally, the horizontal and vertical adjustment mechanisms comprise screws which support the lamp unit in a cantilevered relationship where one end of the screw is attached to the support frame while the other end is attached to the lamp unit. By axially rotating the screw, the point at which the screw is attached to the lamp unit is either moved towards or away from the support frame, depending on the direction of rotation. When the horizontal adjusting screw is thus rotated, the lamp pivots about the vertical adjusting screw and the pivot. Together, the vertical adjusting screw and pivot define the vertical axis of adjustment. In a similar fashion, when the vertical adjusting screw is axially rotated, the lamp unit pivots about its horizontal axis of adjustment, which is defined by the horizontal adjustment screw and the pivot.

In the design and manufacture of vehicle lamps, it has been long recognized that even relatively small, incremental installation cost savings are desirable. This is so because lamp components are typically mass produced and installed. Consequently, over the long run these small savings may add up to substantial amounts. It is this savings that may differentiate one unit from the competition. Therefore, headlamp assemblies are designed to be economical from materials, parts, and installation perspectives.

It has also been recognized that a pivot connection comprised of a ball and socket joint mounted to an appropriate housing part is effective for the purpose of providing pivotable retention. Such connectors are both economical to manufacture and easy to install. In addition, such assemblies provide the capability for removable and pivotable retention of the ball end, a characteristic useful during headlamp repair. Therefore, such arrangements are generally regarded as being particularly well suited for use as pivot connections in headlamps.

Unfortunately, ball and socket arrangements are not without disadvantages. One significant disadvantage of these arrangements is that they comprise multiple parts. The assembly and installation of ball and socket arrangements can be both difficult and time consuming. Typically, the socket and ball stud portions are installed separately, aligned, and then joined. While successful, this approach is inefficient. Further, it may be difficult if space is limited within the vehicle. Thus, manufacturers have endeavored to arrange the components of such assemblies such that their installation is simplified. Further, manufacturers have endeavored to accomplish this goal in light of the previously mentioned business considerations.

Accordingly, it is desirable to provide a ball and socket assembly wherein the socket may be mounted to the housing or mounting bracket with the ball stud already engaged in the socket basket. Additionally, it is desirable to provide a ball and socket assembly wherein the socket may be affixed to a ball-ended stud which is already threadedly retained to a reflector, and then locked to the housing or mounting bracket in some fashion. Moreover, it is desirable to provide a pivot assembly for use in a headlamp which is effective for its intended purpose, low in cost to manufacture, and simple to install. Finally, it is also desirable to provide a pivot assembly comprising the fewest components necessary to suitably retain the headlamp while providing for the desired adjustment.

BRIEF SUMMARY OF THE INVENTION

The present invention comprises a mounting plug for pivotably connecting a first component to a second component. For example, in an exemplary embodiment described herein, the present invention comprises a mounting plug for pivotably connecting an aimable component of a headlamp of a vehicle to a fixed component of the vehicle, with the fixed component formed with an opening there through. An exemplary embodiment of the present invention further comprises a ball stud portion comprising a ball and a post. The post comprises means for attaching the ball stud portion to the aimable component of the headlamp. In an exemplary embodiment, such means comprises a threaded post.

In an exemplary embodiment, the mounting plug further comprises a base, and a socket chamber integrally molded on top of the base. The socket chamber is adapted to removably retain the ball and to allow the ball stud portion to pivot. Moreover, an exemplary embodiment of the present invention further comprises a channel integrally molded to the base adjacent to the socket chamber. The channel is adapted to allow the ball to be inserted through the channel and into the socket chamber. A portion of the channel may be tapered.

An exemplary embodiment of the present invention further comprises a retainer portion integrally molded below the base. The retainer portion comprises at least one tab integrally molded to the retainer portion and adapted to removably secure the socket portion to the fixed component of the vehicle. Furthermore, in exemplary embodiments of the present invention, the at least one tab may comprise a tapered ramp, a bridge section adjacent to the tapered ramp, and a vertical stop wall adjacent to the bridge section. In such exemplary embodiments, the socket portion is removably secured to the fixed component by twist-lock engagement of the tapered ramp and the bridge section of the at least one tab below the opening through the fixed component.

Exemplary embodiments of the present invention may also comprise means for facilitating manual rotation of the retainer portion. For example, in the exemplary embodiment described herein, such means comprises a fin integrally molded on top of the base adjacent to the socket chamber and distal from the channel.

DETAILED DESCRIPTION OF THE INVENTION

Figure 1:
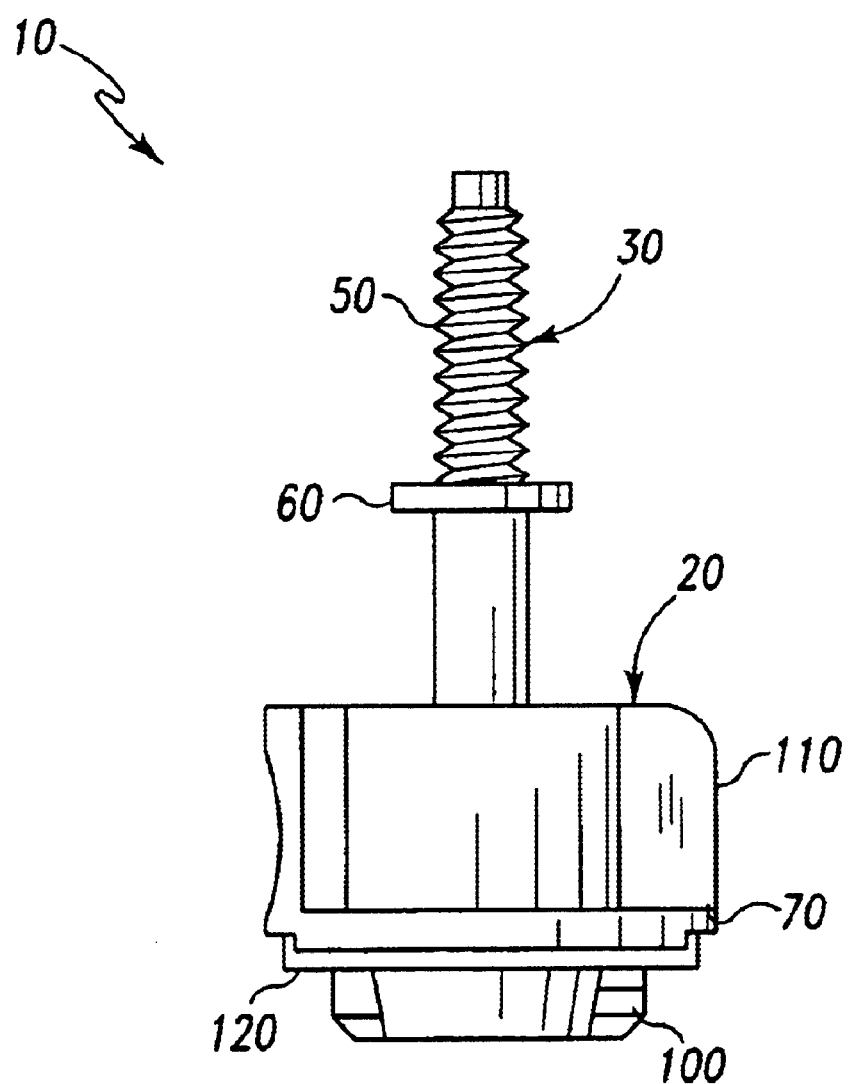
FIG. 1 is a front view of one exemplary embodiment of a headlamp mounting plug in accordance with the present invention.
Figure 2:
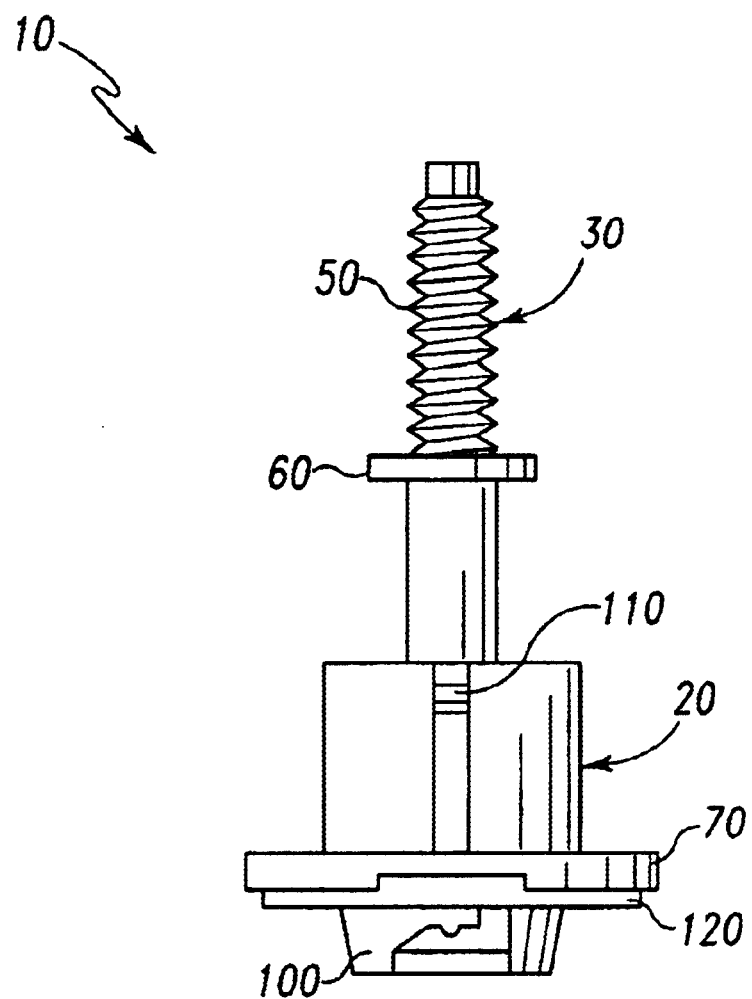
FIG. 2 is a side view of the exemplary embodiment of the headlamp mounting plug of FIG. 1.
Figure 3:
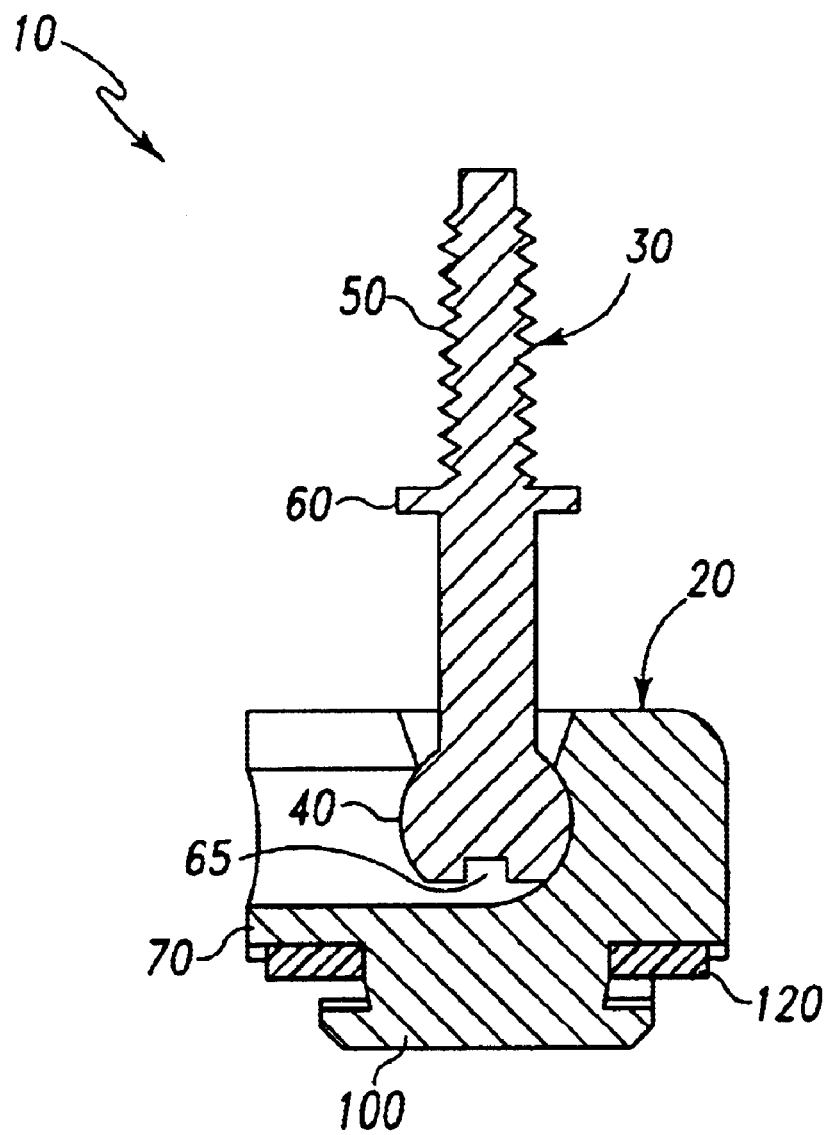
FIG. 3 is a front cross-sectional view of the exemplary embodiment of the headlamp mounting plug of FIG. 1.
Figure 4:
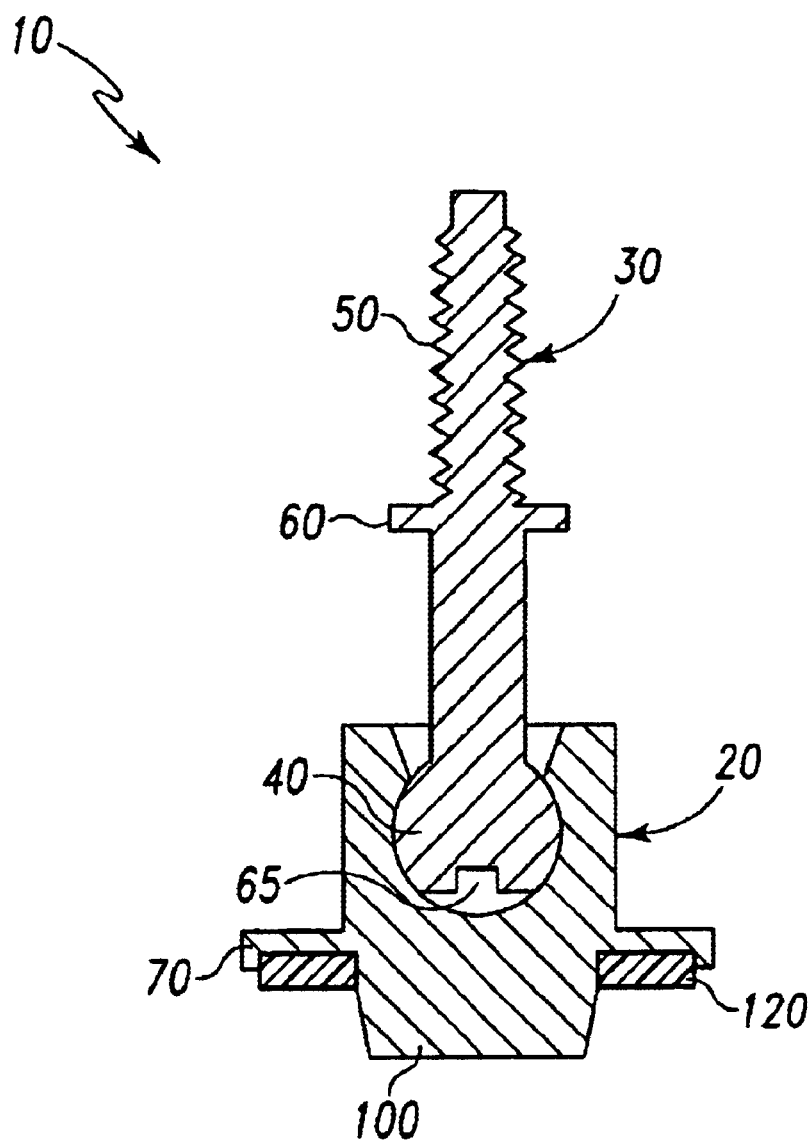
FIG. 4 is a side cross-sectional view of the exemplary embodiment of the headlamp mounting plug of FIG. 1.

FIGS. 1 through 6 show an exemplary embodiment of the headlamp retaining plug 10 of the present invention comprising a ball stud portion 30 and a socket portion 20. An enlarged view of ball stud portion 30 is shown in FIG. 7. As can be seen in FIG. 7, ball stud portion 30 comprises ball 40, post 50, and washer 60. In the exemplary embodiment of the present invention, ball 40 is substantially spherical in shape. At one end of ball 40, distal from post 50, is notch 65. Notch 65 may be configured to accept any one of a number of driving mechanisms known in the art, such as a screwdriver. The specific configuration of notch 65 will be determined by the driving mechanism selected, but may, for example, be a slot, a phillips-head, a hexagon shape or a star shape.

In the present exemplary embodiment, post 50 is threaded and configured to be screw-engaged to an aimable component of a headlamp, which could be any movable/pivotable headlamp component known in the art, such as a reflector in a reflector movable-type headlamp (not shown) or a headlamp housing in an aimable headlamp of the type where the entire headlamp is pivoted to aim (not shown). Additionally, post 50 could be configured to attach to these components using a number of fastening schemes known in the art, such as, for example, the threaded screw mechanism shown, a nut and bolt configuration, or a press fit configuration.

Figure 5:
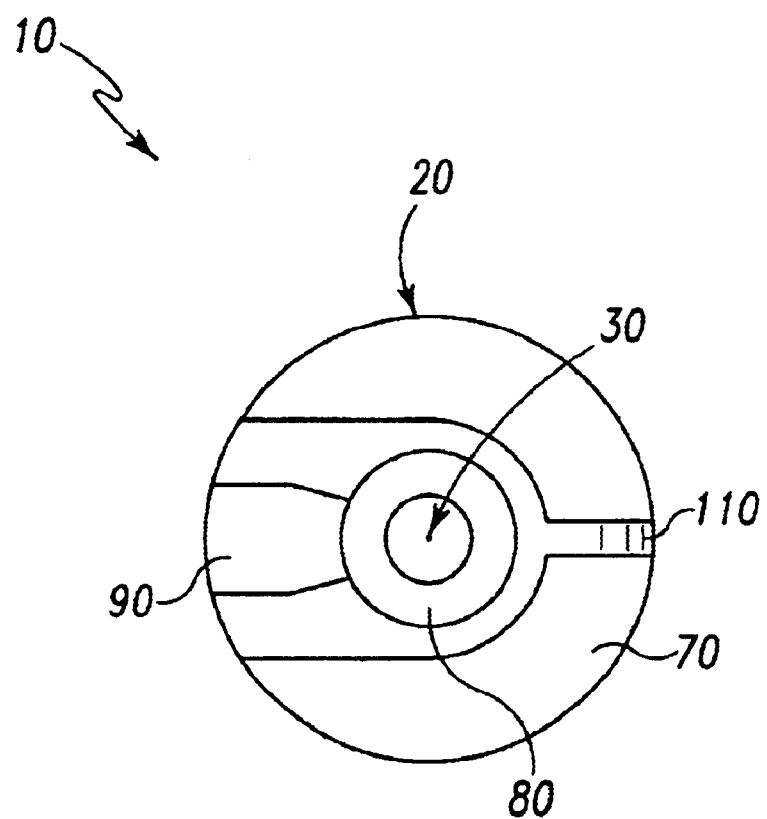
FIG. 5 is a top cross-sectional view of the exemplary embodiment of the headlamp mounting plug of FIG. 1.

Referring again to FIGS. 1 through 6, socket portion 20 comprises base 70, socket chamber 80, channel 90, retainer portion 100, fin 110, and gasket 120, each of which form one integrally molded piece. Socket chamber 80 is dimensioned and configured to accept ball 40 of ball stud portion 30 from channel 90 and to removably retain it as shown in FIG. 5. Socket chamber 80 is open on the side opposite base 70 to allow pivotable movement of ball stud portion 30. This opening in socket chamber 80 is slightly smaller in diameter than ball 40. Therefore, ball 40 is only insertable and removable horizontally via channel 90 and cannot be inserted or removed vertically.

At the closed end, channel 90 has a substantially spherical cross-section dimensioned to accommodate ball 40 and is molded into the top surface of base 70. Channel 90 is open on the side opposite base 70 to allow for passage of post 50 as ball 40 is slid horizontally through channel 90 and into socket chamber 80. As shown in FIG. 5, the open top side of channel 90 is slightly tapered to further retain ball stud portion 30.

Socket portion 20 is integrally formed with and further comprises fin 110 extending radially outwardly from the side of socket chamber 80 directly opposite channel 90. Fin 110 is configured to facilitate manual rotation of the socket portion to accomplish twist-lock engagement with a lamp housing as described below. While fin 110 is utilized in the exemplary embodiment described herein, it will be appreciated by those of ordinary skill in the art that other embodiments of the present invention may utilize other structure or means for facilitating manual rotation of the socket portion. By way of nonlimiting example, a post or small handle could be utilized instead of fin.

Figure 6:
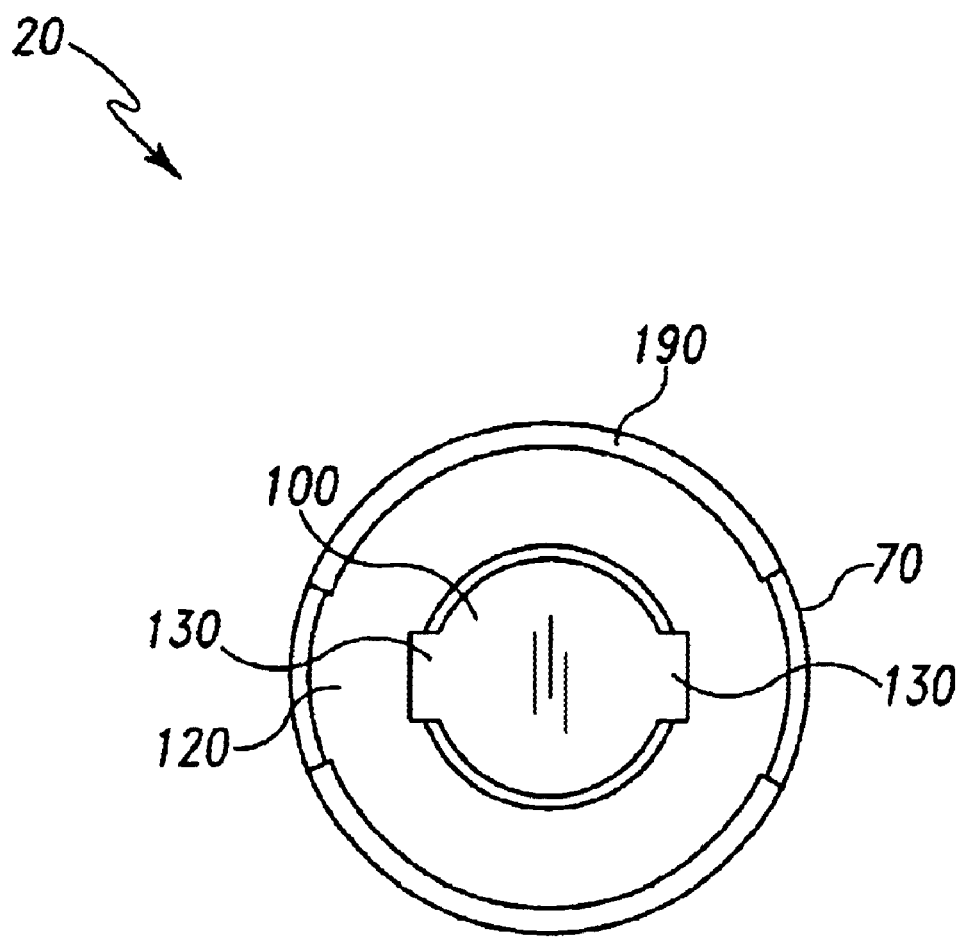
FIG. 6 is a bottom view of the exemplary embodiment of the headlamp mounting plug of FIG. 1.
Figure 7:
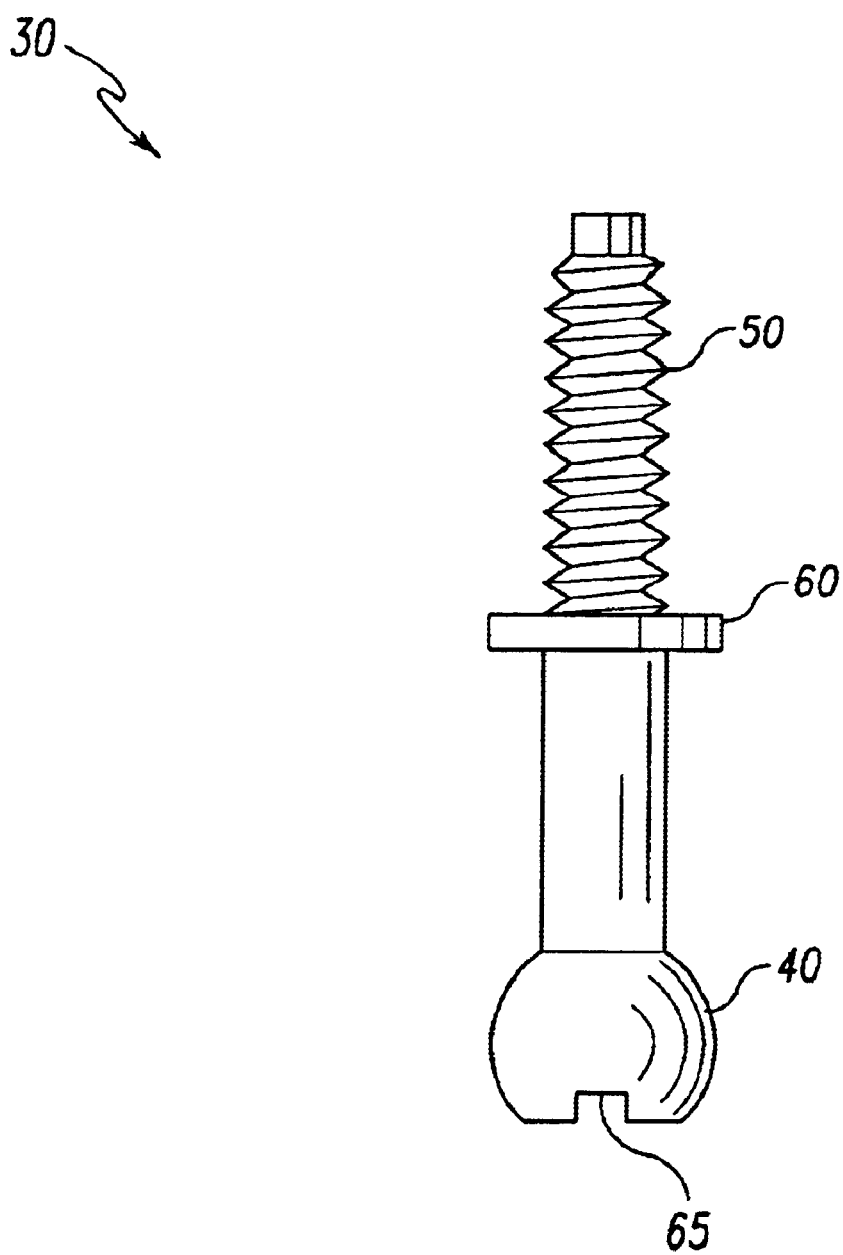
FIG. 7 is a side view of a ball socket portion of the exemplary embodiment of the headlamp mounting plug of FIG. 1.
Figure 9:
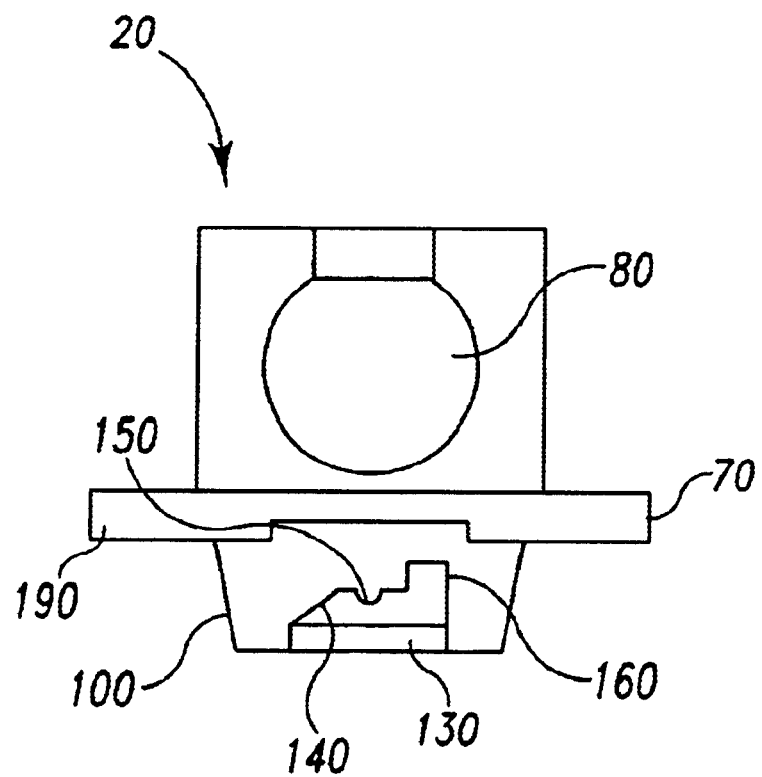
FIG. 9 is side view of the socket portion of the exemplary embodiment of the headlamp mounting plug of FIG. 1.

As shown in FIG. 6, retainer portion 100 is integrally formed as the bottom of socket portion 20. In the exemplary embodiment described herein, retainer portion 100 is circular in shape with a diameter slightly smaller than base 70. Retainer portion 100 is configured to engage a housing or other fixed portion of the vehicle in a twist-lock fashion as described below. In the exemplary embodiment described herein, retainer portion 100 comprises two radially outwardly extending tabs 130 identical in size and configuration. Tabs 130 extend along the same axis as channel 90 and fin 110. As shown in FIG. 9, each tab 130 comprises three sections, a tapered ramp 140, a bridge section 150, and a vertical stop wall 160. Bridge section 150 joins tapered ramp 140 and vertical stop wall 160. Tapered ramp 140 extends from bridge section 150 downwardly to its end. While the exemplary embodiment uses two tabs 130, the number of tabs 130 used can be varied in other embodiments from one tab to any plurality of tabs.

As shown in FIG. 6, socket portion 20 is also provided with gasket 120 to provide a weather-tight seal. Gasket 120 is generally ring-like in shape with an inner diameter and an outer diameter suitably sized to rest adjacent to base 70. Gasket 120 is constructed from a flexible material such as, for example, rubber. The inner diameter of gasket 120 is approximately equal to the diameter of retainer portion 100. The outer diameter is approximately equal to the diameter of base 70. Base 70 is molded with two arc-shaped gasket seating features 190 which raise slightly off the bottom and outer edge surface of base 70. During assembly, gasket 120 is stretched over tabs 130 and retainer portion 100 so that it is seated flat against base 70 and held in correct position by retainer portion 100, gasket seating features 190, and the top side of vertical stop wall 160.

Figure 10:
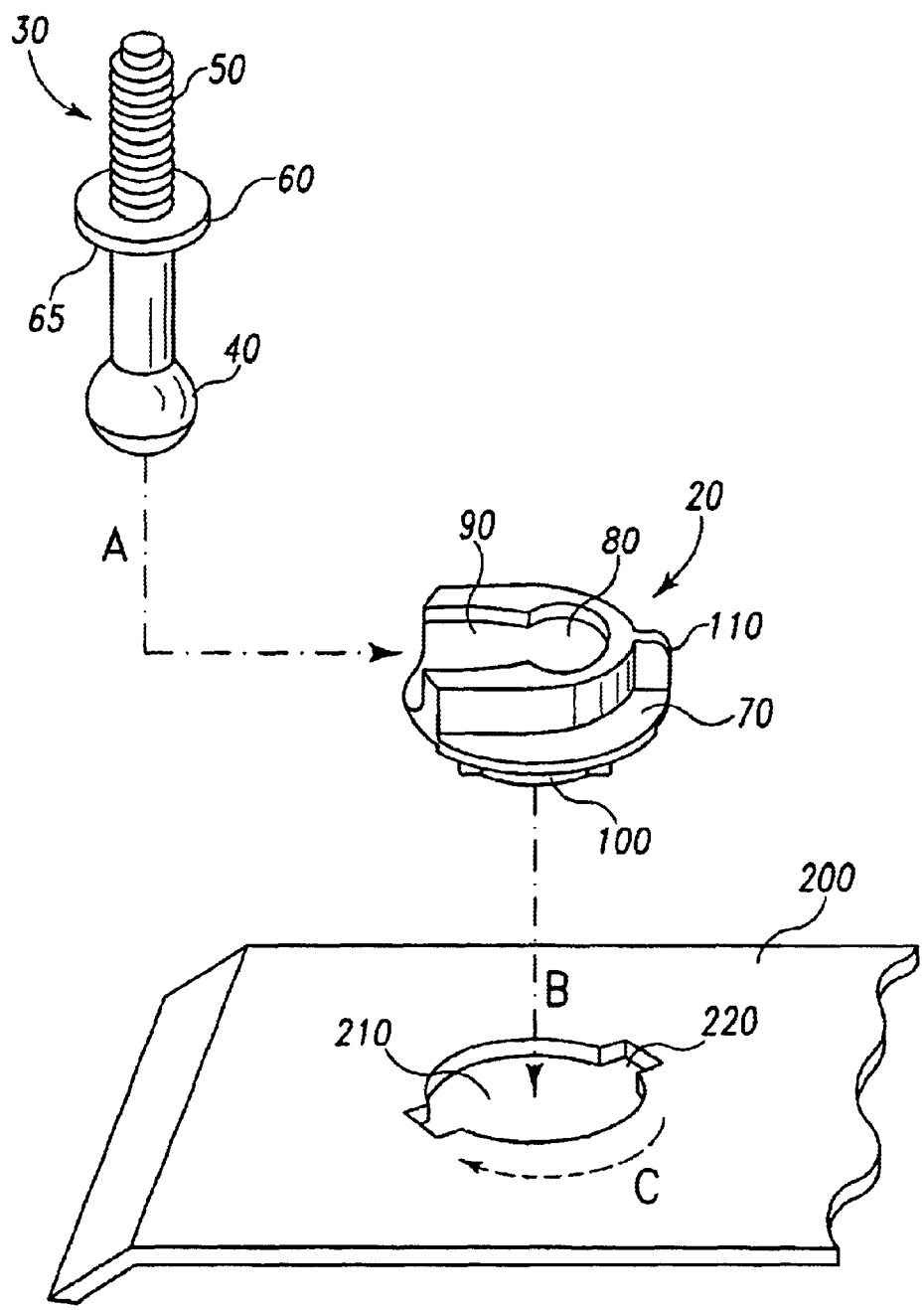
FIG. 10 is an exploded, perspective view of the exemplary embodiment of the headlamp mounting plug of FIG. 1.

FIG. 10 illustrates the assembly of ball stud portion 30 and socket portion 20 and their subsequent attachment to a representative fixed component 200. Fixed component 200 is an example of a fixed piece to which the aimable component of the headlamp is anchored. For example, in an aimable headlamp where only a part of the headlamp is pivoted to aim, fixed component 200 is usually the headlamp housing. In a vehicle in which the entire headlamp assembly is pivoted to aim the light beam, fixed component 200 is usually a mounting bracket on the vehicle.

Fixed component 200 contains opening 210. Opening 210 is substantially circular with a diameter roughly equal to the diameter of retainer portion 100. The diameter of opening 210 must be smaller than the diameter of base 70. Opening 210 also includes two circumferentially spaced rectangular cutouts 220 dimensioned and configured to accommodate tabs 130. The number of cutouts 220 in the exemplary embodiment is two, however, as noted previously, as the number of tabs 130 varies, the number of cutouts 220 will necessarily vary to correspond.

Figure 8:
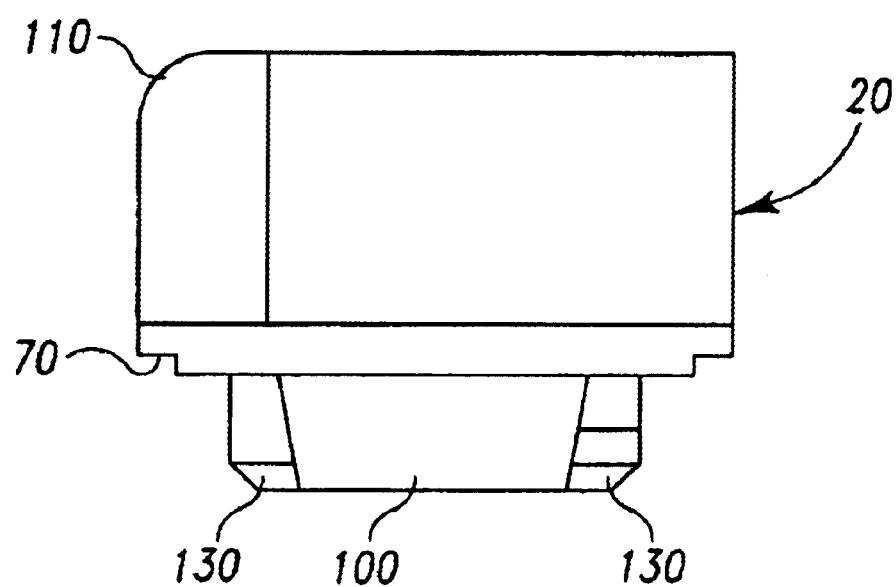
FIG. 8 is a front view of a socket portion of the exemplary embodiment of the headlamp mounting plug of FIG. 1.

Referring to FIG. 8 and FIG. 10, during assembly ball stud portion 30 is inserted into socket portion 20 along path A. Ball 40 is slid down channel 90 and into socket chamber 80. Once in place, ball 40 is frictionally and removably retained in socket chamber 80. Once ball stud portion 30 is in position, it is still allowed to pivot freely within socket chamber 80. Then socket portion 20 is aligned such that tabs 130 align with cutouts 220. Next, retainer portion 100 of socket portion 20 is inserted into opening 210 of fixed component 200 along path B. When retainer portion 100 is inserted into opening 210, tabs 130 insert through cutouts 220. The size of base 70 prevents socket portion 20 from being inserted too far into opening 210.

Once retainer portion 100 is inserted into opening 210, socket portion 20 is rotated clockwise along arc-shaped path C, approximately one-quarter turn, by applying manual force to fin 110 and the walls of socket portion 20. Initially this rotation causes tapered ramps 140 of tabs 130 to contact the edges of cutouts 220. As socket portion 20 is rotated further, tapered ramps 140 force socket portion 20 toward fixed component 200. This compresses gasket 120 between base 70 and fixed component 200 to form a tight environmental seal. Upon further clockwise rotation of socket portion 20, stop walls 160 contact the edges of cutouts 220 and further retention is prevented. In this manner, twist-lock engagement of headlamp retaining plug with fixed component 200 is achieved. In the final engaged position of socket portion 20, the edges of cutouts 220 are compressed against bridge section 150 of tabs 130.

The shape of socket portion 20 is advantageous in that it does not require a complex mold. Additionally, the twist-lock design of retainer portion 100 allows socket portion 20 to be mounted without the use of any additional mounting hardware, such as mechanical fasteners or adhesives, and without the use of any additional processes such as heat or sonic welding. By eliminating the need for additional components or assembly processes, the present invention improves the economic efficiency of production and assembly.

The design of the present invention also allows flexibility in the manufacturing process. The design allows headlamp retaining plug 10 to be either fully assembled before connection of retaining portion 100 to the housing and before attachment of post 50 to the moveable portion of the headlamp, or it allows either of these connections to be completed before ball stud portion 30 is attached to socket portion 20.

Although the present invention has been described in considerable detail with reference to a certain exemplary embodiment thereof, such is offered by way of non-limiting example of the invention, as other versions are possible. It is anticipated that a variety of other modifications and changes will be apparent to those having ordinary skill in the art. Therefore, the spirit and scope of the appended claims should not be limited to the description of the exemplary embodiment contained herein, and the claims should be given the broadest possible interpretation to protect the novel features of the present invention.

What is claimed is:

1. A mounting plug for pivotably connecting an aimable component of a headlamp of a vehicle to a fixed component of the vehicle, wherein the fixed component is formed with an opening there through, said mounting plug comprising:
   a ball stud portion comprising a ball and a post, wherein said post comprises means for attaching said ball stud portion to the aimable component of the headlamp;
   a base, said base comprising at least one integrally molded gasket seating feature;
   a socket chamber integrally molded on top of said base, said socket chamber including an opening, said socket chamber adapted to removably retain said ball with said post extending through the opening and allow said ball stud portion to pivot;
   a channel integrally molded to said base adjacent to said socket chamber, said channel adapted to allow said ball to be inserted through said channel and into said socket chamber;
   a retainer portion integrally molded below said base, said retainer portion comprising at least one tab integrally molded to said retainer portion and adapted to removably secure said socket portion to the fixed component of the vehicle.

2. The mounting plug of claim 1 wherein said means for attaching said ball stud portion to the aimable component of the headlamp comprises a threaded post.

3. The mounting plug of claim 1 further comprising means for facilitating manual rotation of said retainer portion.

4. The mounting plug of claim 3 wherein said means for facilitating manual rotation of said retainer portion comprises a fin integrally molded on top of said base adjacent to said socket chamber and distal from said channel.

5. A mounting plug for pivotably connecting an aimable component of a headlamp of a vehicle to a fixed component of the vehicle, wherein the fixed component is formed with an opening there through, said mounting plug comprising:
   a ball stud portion comprising a ball and a post, wherein said post comprises means for attaching said ball stud portion to the aimable component of the headlamp;
   a base;
   a socket chamber integrally molded on top of said base, said socket chamber including an opening, said socket chamber adapted to removably retain said ball with said post extending through the opening and allow said ball stud portion to pivot;

a channel integrally molded to said base adjacent to said socket chamber, said channel adapted to allow said bail to be inserted through said channel and into said socket chamber;

a retainer portion integrally molded below said base, said retainer portion comprising at least one tab integrally molded to said retainer portion and adapted to removably secure said socket portion to the fixed component of the vehicle; and a gasket located adjacent to and underneath said base, said gasket providing a tight seal between said mounting plug and the fixed component of the vehicle.

6. The mounting plug of claim 5 wherein said ball stud portion further comprises a washer which encircles said post of said ball stud portion.

7. A mounting plug for pivotably connecting an aimable component of a headlamp of a vehicle to a fixed component of the vehicle, wherein the fixed component is formed with an opening there through, said mounting plug comprising:

a ball stud portion comprising a ball and a post, wherein said post comprises means for attaching said ball stud portion to the aimable component of the headlamp, wherein said ball of said ball stud portion comprises means for accepting a driving mechanism to rotate said ball stud portion;

a base;

a socket chamber integrally molded on top of said base, said socket chamber including an opening, said socket chamber adapted to removably retain said ball with said post extending through the opening and allow said ball stud portion to pivot;

a channel integrally molded to said base adjacent to said socket chamber, said channel adapted to allow said ball to be inserted through said channel and into said socket chamber; and a retainer portion integrally molded below said base, said retainer portion comprising at least one tab integrally molded to said retainer portion and adapted to removably secure said socket portion to the fixed component of the vehicle.

8. The mounting plug of claim 7 wherein said means for accepting a driving mechanism to rotate said ball stud portion comprises a star shape.

9. The mounting plug of claim 7 wherein said retainer portion comprises two tabs.

10. A mounting plug for pivotably connecting an aimable component of a headlamp of a vehicle to a fixed component of the vehicle, wherein the fixed component is formed with an opening there through, said mounting plug comprising:

a ball stud portion comprising a ball and a post, wherein said post comprises means for attaching said ball stud portion to the aimable component of the headlamp;

a base;

a socket chamber integrally molded on top of said base, said socket chamber including an opening, said socket chamber adapted to removably retain said ball with said post extending through the opening and allow said ball stud portion to pivot;

a channel integrally molded to said base adjacent to said socket chamber, said channel adapted to allow said ball to be inserted through said channel and into said socket chamber;

a retainer portion integrally molded below said base, said retainer portion comprising at least one tab integrally molded to said retainer portion and adapted to removably secure said socket portion to the fixed component of the vehicle, wherein said at least one tab comprises a tapered ramp, a bridge section adjacent to said tapered ramp, and a vertical stop wall adjacent to said bridge section.

11. The mounting plug of claim 10 wherein said socket portion is removably secured to the fixed component of the vehicle by twist-lock engagement of said tapered ramp and said bridge section of said at least one tab below said opening through the fixed component of the vehicle.

12. A mounting plug for pivotably connecting a first component to a second component, where the second component is formed with an opening there through, said mounting plug comprising:

a ball stud portion comprising a ball and a post, said post comprising means for attaching said ball stud portion to the first component;

a socket portion comprising a channel adapted to allow said ball to be inserted through said channel and a chamber adjacent to said channel, said chamber adapted to removably retain said ball and to allow said ball stud portion to pivot;

a retainer portion integrally molded below said socket portion, said retainer portion comprising at least one tab and adapted to removably secure said socket portion to the second component; and a gasket located adjacent to and underneath said socket portion, said gasket providing a tight seal between said mounting plug and the second component.

13. The mounting plug of claim 12 wherein said means for attaching said ball stud portion to the first component comprises a threaded post.

14. The mounting plug of claim 12 wherein said means for facilitating manual rotation of said retain portion comprises a fin integrally molded on top of said base distal from said channel.

15. The mounting plug of claim 12 wherein said ball of said ball stud portion comprises means for accepting a driving mechanism to rotate said ball stud portion.

16. The mounting plug of claim 15 wherein said means for accepting a driving mechanism to rotate said ball stud portion comprises a star shape.

17. The mounting plug of claim 12 wherein said retainer portion comprises two tabs.

18. The mounting plug of claim 12 wherein said at least one tab comprises a tapered ramp, a bridge section adjacent to said tapered ramp, and a vertical stop wall adjacent said bridge section.

19. The mounting plug of claim 18 said socket portion is removably secured to the second component by twist-lock engagement of said tapered ramp and said bridge section of said at least one tab below said opening through the second component.

20. A socket assembly for receiving a ball and post, the socket assembly comprising:

(a) a chamber designed and dimensioned to receive the ball;

(b) a first opening to the chamber that is smaller in diameter than the diameter of the ball and larger in diameter than the diameter of the post, the diameter of the first opening thereby preventing passage of the ball through the first opening; and (c) a channel leading to the chamber, the channel designed and dimensioned to allow passage of the ball through the channel and into the chamber, wherein the channel leading to the chamber includes a second opening along the length of the channel and terminating into the first opening, the second opening defining a width that is smaller than the diameter of the ball and larger than the diameter of the post, the second opening thereby allowing the post to pass along the second opening and into the first opening as the ball passes through the channel and into the chamber.

21. The socket assembly of claim 20 wherein the first opening defines a first axis of entry into the chamber and the channel defines a second axis of entry into the chamber, the first axis of entry being substantially perpendicular to the second axis of entry.

22. A ball and socket assembly for pivotably connecting a first component and a second component, the ball and socket assembly comprising:
  (a) a ball and an attached post wherein said post is attached to the first component; and
  (b) a socket assembly comprising:
    (i) a chamber for receiving the ball;
    (ii) a first opening in the socket chamber, the opening having a diameter that is larger than the diameter of the post but smaller than the diameter of the ball; and
    (iii) a channel leading to the chamber, the channel designed and dimensioned to allow passage of the ball through the channel and into the chamber, wherein the channel leading to the chamber includes a second opening along the length of the channel and terminating into the first opening, the second opening defining a width that is smaller than the diameter of the ball and larger than the diameter of the post, the second opening thereby allowing the post to pass along the second opening and into the first opening as the ball passes through the channel and into the chamber.

23. The ball and socket assembly of claim 22 wherein the first opening defines a first axis of entry into the chamber and the channel defines a second axis of entry into the chamber, the first axis of entry being substantially perpendicular to the second axis of entry.

24. A ball and socket assembly for pivotably connecting a first component and a second component, the ball and socket assembly comprising:
  (a) a ball and an attached post wherein the post is attached to said first component; and
  (b) a socket assembly comprising a socket body having a top, at least one side and a bottom, said socket body is attached to said second component:
    (i) a chamber dimensioned to receive the ball formed within said socket body;
    (ii) a first opening formed in the top of said socket body and communicating with said chamber, the first opening having a diameter that is larger than the diameter of the post but smaller than the diameter of the ball and thereby prevents passage of the ball through the first opening, wherein the first opening and the chamber define a post axis that extends between the middle of the first opening and the center of the chamber;
    (iii) a channel formed in the side of the socket body and leading to the chamber, said channel having a narrowed slot that extends across said side and top of said socket body and communicates with said first opening and said slot is dimensioned to allow said post to pass through said slot but not to allow said ball to pass through said slot, the channel defining a central channel axis that extends along the length of the channel such that the channel axis is substantially perpendicular to the post axis, the channel dimensioned along said channel axis to allow passage of the ball through the channel and into the chamber: and said slot dimensioned to allow said post to pass through said slot so that said post can be aligned with said post axis when said ball is in said chamber.

25. The ball and socket assembly of claim 24 wherein the socket assembly further includes a retainer portion adjacent to the chamber, the retainer portion comprising at least one tab and adapted to removably secure the socket assembly to said second component.

26. The ball and socket assembly of claim 25 wherein an integrally molded base is positioned between the chamber and the retainer portion.

27. The ball and socket assembly of claim 24 further comprising a means for facilitating manual rotation of the socket assembly.

28. The ball and socket assembly of claim 27 wherein the means for facilitating manual rotation of the socket assembly is a fin.

29. A mounting plug for pivotably connecting a first component of a vehicle to a second component of the vehicle, wherein the first component is attached to a ball and stud portion and the second component is formed with a hole therethrough and at least one cutout along the perimeter of the hole, the mounting plug comprising:
  a. a socket defining a chamber and an opening to the chamber, the chamber adapted to removably retain said ball with said stud extending through the opening and allow said ball and stud portion to pivot; and
  b. a base adjacent to the socket, such that the socket is positioned on a first side of the base; and
  c. a retainer portion adjacent to the base such that the retainer portion is positioned on a second side of the base, the retainer portion including at least one tab designed and dimensioned to fit through said at least one cutout, the at least one tab including a bridge section and a vertical stop wall.

30. The mounting plug of claim 29 wherein the vertical stop wall contacts said cutout when the retainer portion is inserted into said hole and rotated within said hole.

31. The mounting plug of claim 30 further comprising a means for facilitating manual rotation of the socket assembly.

32. The ball and socket assembly of claim 31 wherein the means for facilitating manual rotation of the socket assembly is a fin formed adjacent to the socket and the base.

* * * * *